United States Patent
Sheng et al.

(10) Patent No.: US 6,252,670 B1
(45) Date of Patent: Jun. 26, 2001

(54) METHOD FOR ACCURATELY CALIBRATING A CONSTANT-ANGLE REFLECTION-INTERFERENCE SPECTROMETER (CARIS) FOR MEASURING PHOTORESIST THICKNESS

(75) Inventors: Han-Ming Sheng, Hsin-chu; Ren-Jyh Leu, Taipei, both of (TW)

(73) Assignee: Taiwan Semiconductor Manufacturing Company, Hsin-chu (TW)

( * ) Notice: Subject to any disclaimer, the term of this patent is extended or adjusted under 35 U.S.C. 154(b) by 0 days.

(21) Appl. No.: 09/429,672

(22) Filed: Oct. 29, 1999

(51) Int. Cl.[7] .................................................. G01B 9/02
(52) U.S. Cl. ................................................................ 356/504
(58) Field of Search ................................. 356/485, 492, 356/503, 504, 517, 632

(56) References Cited

U.S. PATENT DOCUMENTS

| | | | |
|---|---|---|---|
| 3,824,017 | * | 7/1974 | Gaylon ................................. 356/504 |
| 4,454,001 | * | 6/1984 | Sternheimer et al. ............... 356/504 |
| 4,670,650 | | 6/1987 | Matsuzuwa et al. . |
| 5,337,150 | | 8/1994 | Mumola . |
| 5,646,734 | | 7/1997 | Venkatesh et al. . |
| 5,856,871 | * | 1/1999 | Cabib et al. ......................... 356/503 |

\* cited by examiner

*Primary Examiner*—Samuel A. Turner
(74) *Attorney, Agent, or Firm*—George O. Saile; Stephen B. Ackerman

(57) ABSTRACT

A method is described for determining more accurate Cauchy coefficients for a constant-angle reflection-interference spectrometer (CARIS). This allows photoresist thicknesses for product wafers to be measured more accurately. The method for determining the Cauchy coefficients consists of coating monitor wafers with photoresist layers having various thicknesses formed by varying the spin speed during photoresist coating. The photoresist layers are then patterned using monochromatic radiation through a mask and developing photoresist. The monochromatic radiation has a dose sufficient to just clear the photoresist layers from the surface of the wafers during development. The linewidths of the photoresist are measured and plotted as a function of photoresist thickness to generate a critical dimension (CD) swing curve having an essentially sinusoidal shape that results from interference between the transmitted and reflected monochromatic radiation in the photoresist. The monitor wafer for a predetermined minimum in the CD swing curve is used to calculate more precisely the Cauchy coefficients for the refractive index for the photoresist. The refractive index as a function of frequency (Cauchy equation) is used is used with CARIS to measure photoresist thickness more accurately for product wafers.

16 Claims, 4 Drawing Sheets

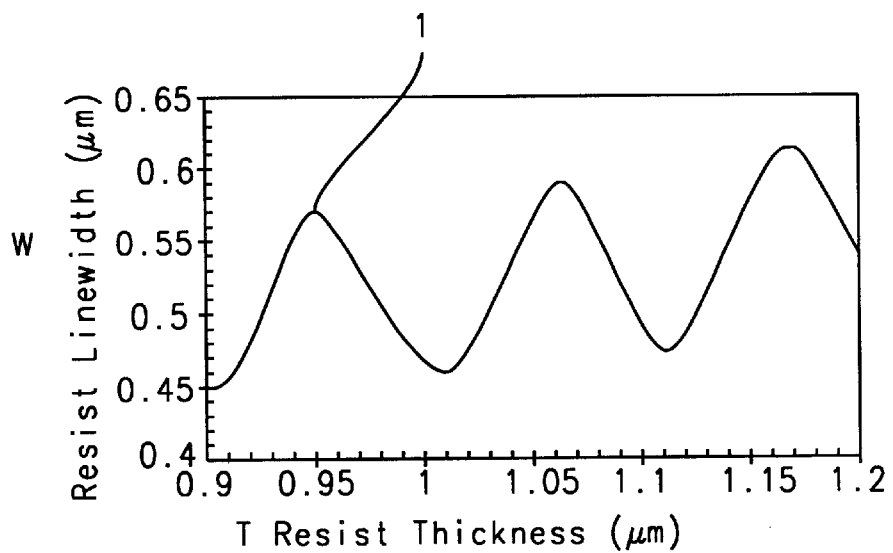
*FIG. 1 - Prior Art*
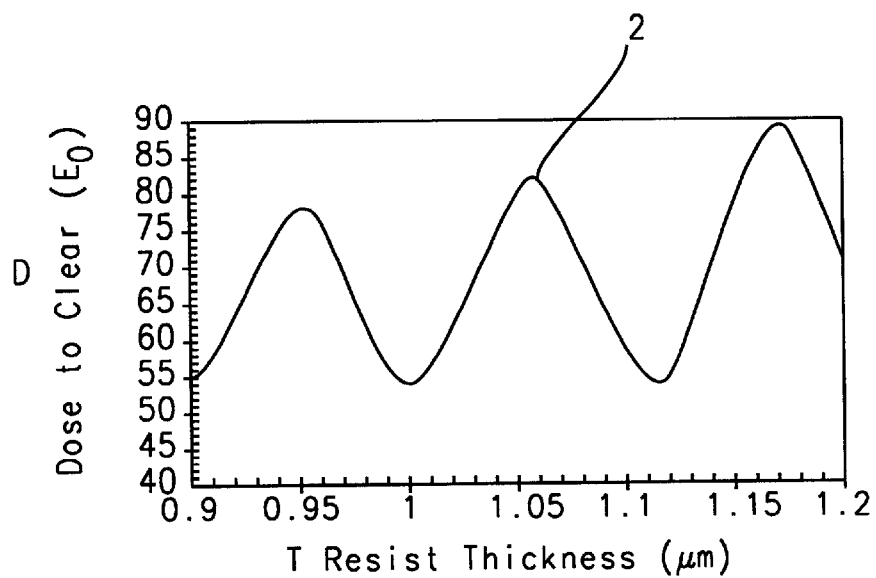
*FIG. 2 - Prior Art*

METHOD FOR ACCURATELY CALIBRATING A CONSTANT-ANGLE REFLECTION-INTERFERENCE SPECTROMETER (CARIS) FOR MEASURING PHOTORESIST THICKNESS

BACKGROUND OF THE INVENTION

(1) Field of the Invention

The present invention relates to semiconductor processing for integrated circuits, and more particularly relates to a method for accurately calibrating a constant-angle reflection-interference spectrometer (CARIS) used to measure photoresist thickness on wafers. Monitor wafers having patterned photoresist layers of varying photoresist thickness are used to generate swing curves. These swing curves, resulting from standing waves formed from interference during optical exposure, are manifested by sinusoidal variations in the critical dimensions (CD) as a function of photoresist thickness when the photoresist is developed. The minima in these curves are used to select a monitor wafer with a more accurately known photoresist thickness. The monitor wafer is used to determine more accurate Cauchy coefficients for calibrating the CARIS tool which is then used to measure more accurate photoresist thickness for product wafers.

(2) Description of the Prior Art

Semiconductor processing for forming integrated circuits requires a series of processing steps. These processing steps include the deposition and patterning of a variety of material layers, such as insulating layers, polysilicon layers, metal layers, and the like. The material layers are typically patterned using a patterned photoresist layer as an etch mask that is patterned over the material layer. The photoresist layer is deposited to the desired thickness by spin coating. The photoresist is then subjected to monochromatic radiation (light) through a photomask or reticle to a desired dose, and then developed in a photoresist developer to form the photoresist etch mask.

As the minimum feature sizes on the semiconductor circuits decrease to submicrometer dimensions, it becomes necessary to more accurately control the critical dimensions (CD). However, the CD of the photoresist image is dependent on numerous processing parameters, such as the photoresist type, radiation dose for exposing the photoresist, development time, and photoresist thickness. Therefore, to control the photoresist CD, it is necessary to accurately determine the photoresist thickness.

Typically the resist thickness is measured using a constant-angle reflection-interference spectrometer (CARIS). The radiation reflected off the resist layer and off the substrate results in fringes which are a function of the wavelength. However, since the optical dispersion (as measured by the refractive index n) is also a function of radiation wavelength, it is necessary to determine the index as a function of wavelength. In the visible range of the radiation, the dependence of refractive index n on wavelength is described by the empirical Cauchy equation $$n = n_1 + n_2/(\text{lamda})^2 + n_3/(\text{lamda})^4$$

where n is the refractive index, $n_1$, $n_2$, and $n_3$ are the Cauchy coefficients, and lamda is the wavelength.

Another problem that can complicate the CD control is the swing effect. This occurs when the photoresist is exposed using monochromatic radiation. The constructive and destructive interference between the incident radiation and reflected radiation from the wafer surface result in standing wave edge profiles in the photoresist image when the resist image is developed. This effect manifests itself as a sinusoidal variation in the resist linewidth image as a function of the thickness of the photoresist. This is best depicted by the curve 1 in FIG. 1 of the prior art where the variation in photoresist image size (linewidth) W in micrometers (um) is plotted as a function of photoresist thickness T in um, and is commonly referred to as the CD swing curve. The exposure dose D, in milliJoules/cm$^2$, to just clear the resist during development as a function of resist thickness T (um) is depicted by curve 2 of prior art FIG. 2. A plot of this curve also displays the characteristic swing effect. This swing effect shows that the CD of a photoresist linewidth can vary by about 0.1 um for a linewidth having a CD of about 0.5 um, which is a wide variation and is undesirable. One method of minimizing this swing effect by the prior art is to use antireflective coatings (ARCs) to minimize the reflected radiation.

Several techniques for measuring film thicknesses have been reported. One method of measuring the thickness and refractive index of films is described in U.S. Pat. No. 5,646,734 to Venkatesh et al. Another method is described in U.S. Pat. No. 4,670,650 to Matsuzawa et al. in which Auger electron spectroscopy is used for measuring the latent image prior to developing the photoresist and therefore avoids additional manufacturing cost. Mumola in U.S. Pat. No. 5,337,150 describes a method for measuring thin film thicknesses using a correlation reflectometer and a reference wafer having various thicknesses.

However, there is still a need in the semiconductor industry to provide more accurate Cauchy coefficients for the conventional CARIS instrument.

SUMMARY OF THE INVENTION

It is therefore a principal object of this invention to provide a method for measuring photoresist thickness more accurately using constant-angle reflection-interference spectroscopy (CARIS).

It is another object of this invention to use the critical dimensions (CD) of a photoresist pattern as a function of the photoresist thickness on a monitor (dummy) wafer to generate swing curves and to use the swing curves to provide more accurate Cauchy coefficients. The Cauchy coefficients are then used with a CARIS instrument to accurately measure photoresist thickness on product wafers prior to developing the photoresist pattern.

The method begins by providing monitor (dummy) wafers, such as silicon substrates. A silicon oxide layer is formed on the substrates by thermal oxidation, followed by the deposition of a silicon nitride ($Si_3N_4$) layer. The wafers are then coated with a photoresist of various thicknesses by spin coating at various spin speeds. The photoresist is exposed through a photoresist mask or reticle and the photoresist is developed to provide photoresist images having the required critical dimensions. Monochromatic radiation (light) is used to expose the photoresist. The photoresist is exposed at a dose $E_0$, typically measured in mJ/cm$^2$, that just clears the photoresist layers when developed. The critical dimensions (CD) or linewidths of the photoresist patterns are measured for the various thicknesses. The photoresist linewidths or CDs are plotted as a function of photoresist thickness to generate a sinusoidal-shaped curve, commonly referred to as a CD swing curve. The dose to clear $E_0$ can also be plotted as a function of thickness to generate a sinusoidal curve, also referred to as an $E_0$ swing curve. These swing curves are a result of the interference between the transmitted and reflected monochromatic radiation in the photoresist. The monitor wafer having a photoresist thicknesses for a predetermined minimum in the swing curve is selected to more accurately determine the photoresist thickness, (fine tuning the photoresist thickness). The monitor wafer having this more accurate photoresist thickness is then used to calculate the refractive index for three different wavelengths using a refractometer to determine the refractive index. The three refractive indexes are substituted in the Cauchy equation $$n = n_1 + n_2/\lambda^2 + n_3/\lambda^4$$

to form three simultaneous equations which are then solved for the Cauchy coefficients $n_1$, $n_2$, and $n_3$. These more accurate Cauchy coefficients are used to calibrate CARIS to measure photoresist thickness on product wafers.

BRIEF DESCRIPTION OF THE DRAWINGS

The objects and other advantages of this invention are best understood with reference to the preferred embodiment when read in conjunction with the following drawings.

FIG. 1 is a curve of the critical dimension (CD) swing curve showing a sinusoidal variation in photoresist linewidth as a function of photoresist thickness measured in micrometers (um) by the prior art.

FIG. 2 is a curve of the dose to clear ($E_0$) measured in mJ/cm$^2$ swing curve showing a sinusoidal variation in $E_0$ a function of photoresist thickness by the prior art.

DESCRIPTION OF THE PREFERRED EMBODIMENT

Now, by the method of this invention, the method for determining more accurate Cauchy coefficients for a constant-angle reflection-interference spectrometer, commonly referred to as CARIS, is described. The method utilizes a minimum in a CD swing curve to select a monitor wafer having a more accurately determined photoresist thickness. The monitor wafer is then used to determine the refractive index n at three different wavelengths. Then the Cauchy equations are simultaneously solved for the three unknown Cauchy coefficients $n_1$, $n_2$, and $n_3$.

The method is shown for a particular photoresist type, more specifically type PFI-38 Eth, manufactured by Sumitomo Company of Japan, and is measured on a substrate having a silicon nitride layer on the surface. However, the method is equally applicable to other photoresist types, both positive and negative, and on other types of reflecting surfaces, as would be understood by one skilled in the art.

Figure 3:
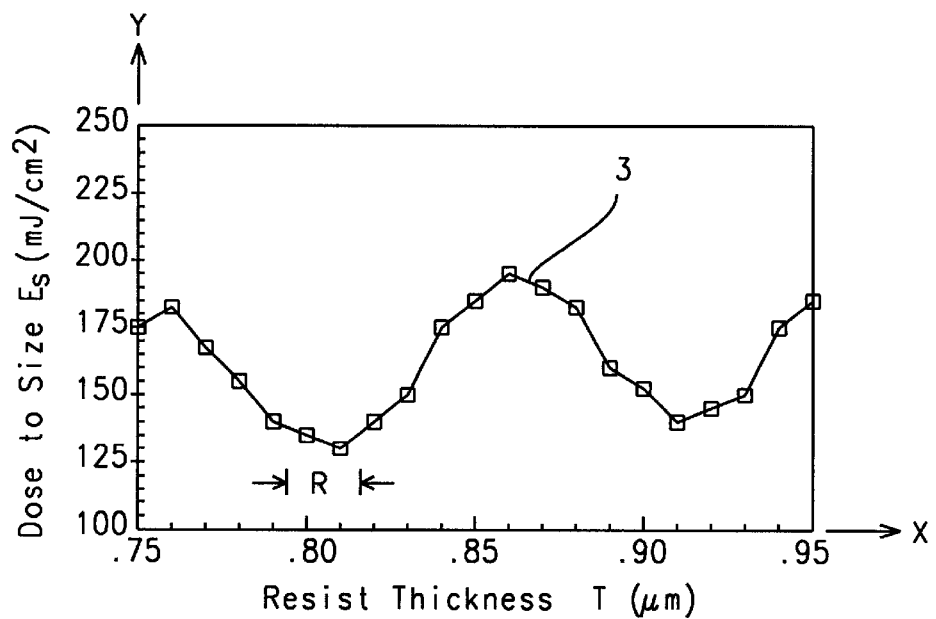
FIG. 3 is a simulation of the photoresist dose to size $E_s$ swing curve as a function of photoresist thickness using a simulation program for a photoresist for the current invention.
Figure 4:
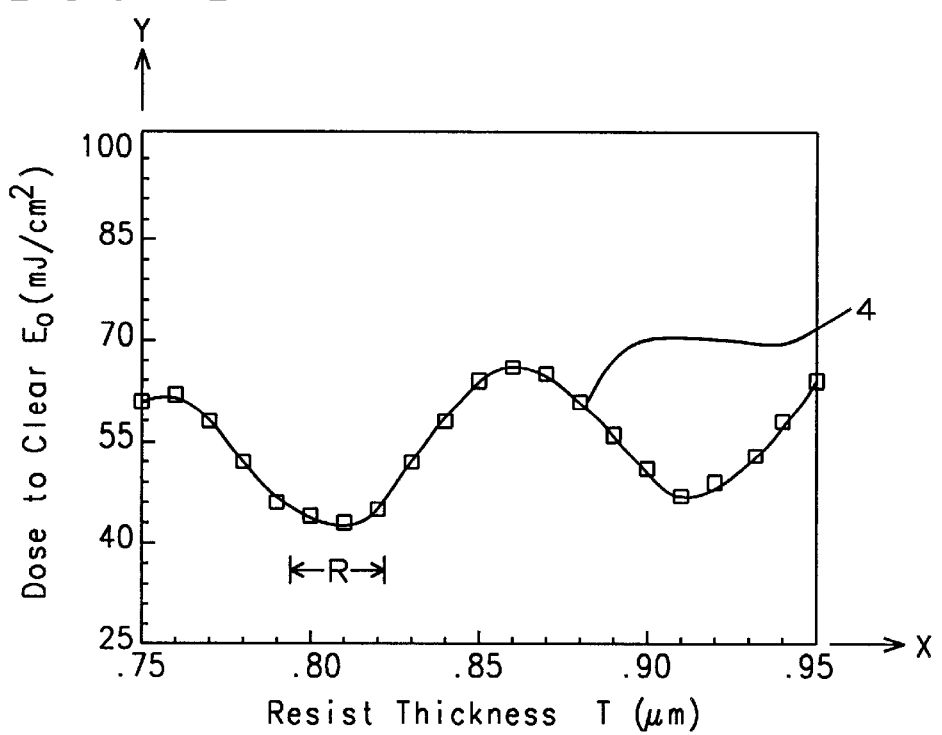
FIG. 4 is a simulation of the dose to clear (threshold energy) to just clear the photoresist as a function of photoresist thickness using a simulation program for a photoresist for the current invention.

Referring to FIGS. 3 and 4, the swing curves are approximated using a simulation program (PROLITH/2) provided by FINLE Technologies, Inc. of U.S.A. FIG. 3 shows the swing curve 3 for the dose to size $E_s$ in mJ/cm$^2$ along the vertical axis Y as a function of the photoresist thickness T, measured in um, along the X axis for the PFI-38 Eth photoresist on a silicon substrate having about 200 Angstroms of silicon oxide and about 1500 Angstroms of silicon nitride. $E_s$ is the energy to determine the critical dimension as a function of photoresist thickness T.

FIG. 4 shows a similar swing curve 4 for the dose to clear $E_0$ measured in mJ/cm$^2$ along the Y axis as a function of the photoresist thickness T, measured in um, along the X axis. $E_0$ is the minimum energy required to clear the exposed photoresist during development.

Still referring to FIG. 3 or FIG. 4, by the method of this invention, the approximate range R of photoresist thickness T is determined for a minimum in the swing curve.

Figure 5:
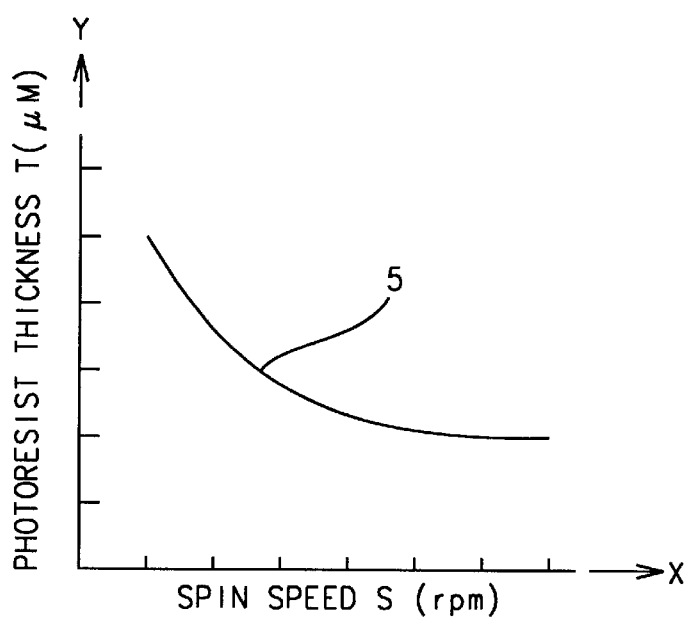
FIG. 5 is a graph showing the photoresist thickness T as a function of spin speed S for the photoresist of this invention.

Referring now to FIG. 5, a series of monitor wafers is prepared having photoresist thicknesses T that vary over the range R for the minimum in the swing curves of either FIG. 3 or 4. The varying photoresist thickness on the series of monitor wafers is achieved by varying the spin speed S during photoresist coating or deposition. The variations in photoresist thickness T along the Y axis are plotted as a function of spin speed S in revolutions per minute (rpm) along the X axis, as depicted by the curve 5 in FIG. 5.

Figure 6:
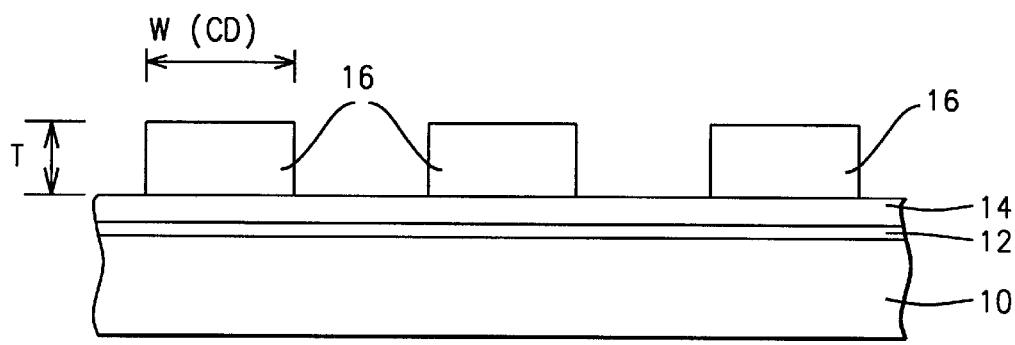
FIG. 6 is a schematic cross-sectional view showing one of a series of monitor wafers for measuring the photoresist width W (CD) as a function of photoresist thickness T used by this invention to determine more accurately the photoresist thickness using the minimum in the CD swing curve.

Referring to FIG. 6, a schematic cross section is shown through one of the typical monitor wafers. The wafers are preferably silicon substrates 10 having a silicon oxide layer 12, about 200 Angstroms thick, and a silicon nitride layer 14, about 1500 Angstroms thick. A photoresist layer 16 is deposited on each of the wafers to various thicknesses by varying the spin speed as shown in FIG. 5. The photoresist is then soft-baked (commonly referred to a pre-exposure bake) to remove the majority of solvents and depends on the various types of photoresist used as required. Next the photoresist 16 is optically exposed through a photoresist mask or reticle (not shown) to form the photoresist lines having a CD of W. Now, according to the swing effect the linewidths W vary in width as a function of photoresist thicknesses T, according to the swing curve in FIG. 3. The photoresist layer 16 is optically exposed using a monochromatic deep ultraviolet (UV) radiation having a wavelength of between about 193 and 405 nanometers. The radiation dose $E_0$, in mJ/cm$^2$, is adjusted as shown in the swing curve 4 of FIG. 4 to just remove the exposed photoresist during development.

Figure 7:
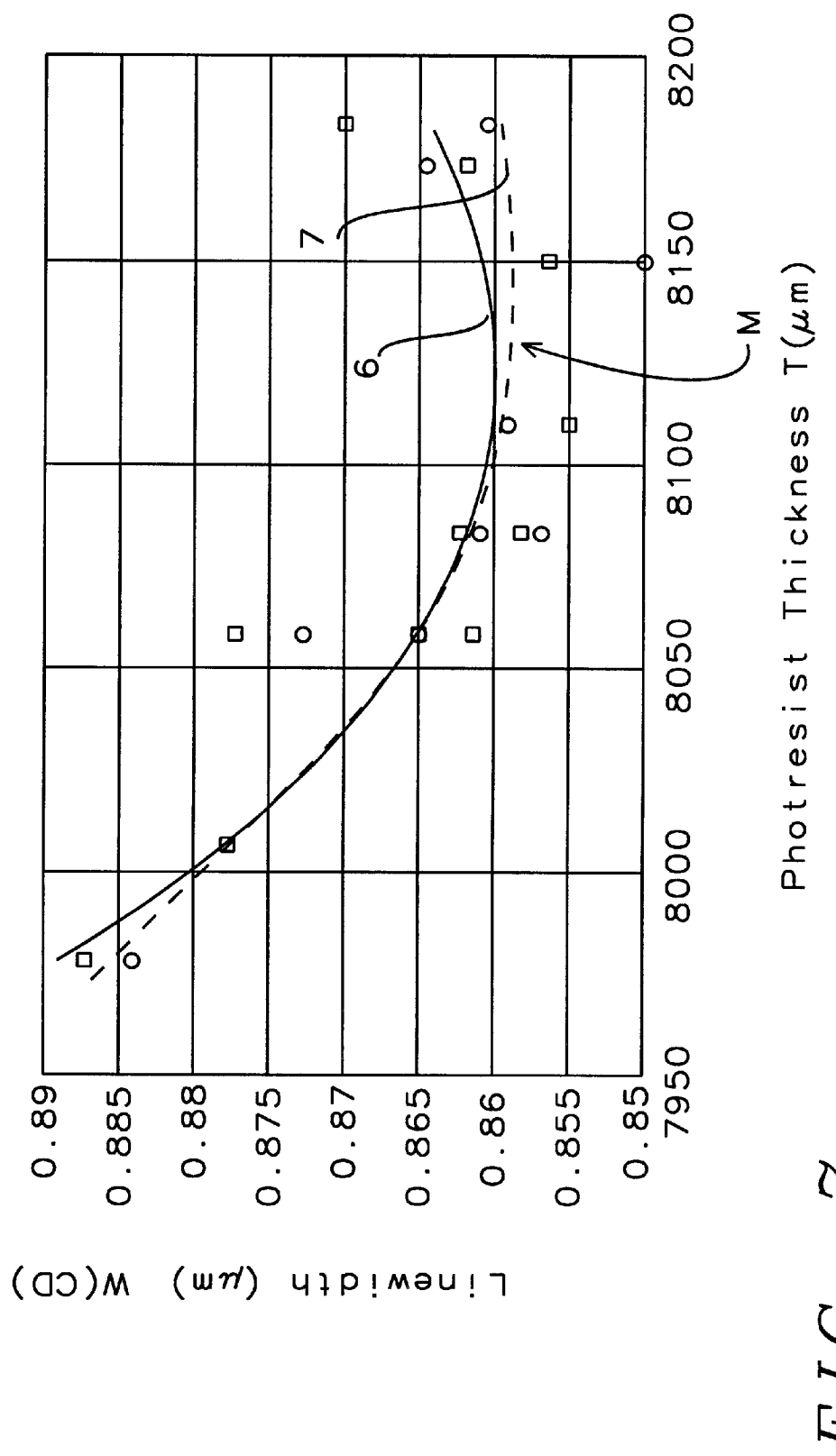
FIG. 7 is a graph of the measured photoresist width W as a function of photoresist thickness T near a minimum in the swing curve to more accurately determine (fine tune) the photoresist thickness on a monitor wafer for determining the Cauchy coefficients more accurately.

Referring now to FIG. 7, the variation in linewidth W of the photoresist is plotted as a function of photoresist thickness T in the range R of FIG. 3 or 4 to more accurately determine the photoresist thickness on the monitor wafers. This plot of CD versus T allows one to select a monitor wafer having a more precise thickness, such as at the minimum in the swing curve. For example, for the photoresist PFI-38 Eth, the monitor wafer having a minimum M at 8,125 Angstroms can be used to determine the refractive index, and hence determine the Cauchy coefficients more accurately. Preferably the photoresist linewidth W and the photoresist thickness T are measured using a scanning electron microscope (SEM). The curve 6 in FIG. 7 is a plot of the theoretical or simulated curve for CD swing curve as a function of photoresist thickness T, while curve 7 is a curve of the actual measurements taken from the monitor wafers. The accuracy of the CD using the SEM is determined by first calibrating the SEM using a standard. The standard is a wafer having a patterned polysilicon or silicon nitride layer that was measured to have an accuracy of less than 0.003 micrometers.

Continuing, the monitor wafer having this more accurate photoresist thickness T is then used to calculate the refractive index n for three different wavelengths in the visible optical range using a refractometer. For example, the measurements can be made on an AUTO ABBE Refractometer, manufactured by Leica Microsystems of Germany.

The refractive index n at these three different wavelengths is substituted in the Cauchy equation $$n = n_1 + n_2/(\text{lambda})^2 + n_3/(\text{lambda})^4$$

to form three simultaneous equations which are then solved for the Cauchy coefficients $n_1$, $n_2$, and $n_3$. These more accurate Cauchy coefficients can then be used to calibrate CARIS to measure photoresist thickness for product wafers.

While the invention has been particularly shown and described with reference to the preferred embodiment thereof, it will be understood by those skilled in the art that various changes in form and detail may be made without departing from the spirit and scope of the invention.

What is claimed is:

1. A method for measuring photoresist thickness using a constant-angle reflection-interference spectrometer (CARIS) with more accurate Cauchy coefficients comprising the steps of:

coating monitor wafers with photoresist layers having varying thicknesses formed by varying the spin speed during said coating of said photoresist layers;

exposing said photoresist layers using monochromatic radiation through a mask and developing said photoresist layers to form photoresist patterns, wherein said radiation has a dose sufficient to just clear said photoresist layers during development;

measuring the linewidths of said photoresist patterns and plotting said linewidths as a function of photoresist thickness to generate a critical dimension (CD) swing curve having an essentially sinusoidal shape resulting from interference between the transmitted and reflected said monochromatic radiation in said photoresist;

using one of said monitor wafers having one of said photoresist thicknesses for a predetermined minimum in said CD swing curve to calculate more precisely said Cauchy coefficients for measuring said thicknesses;

using said Cauchy coefficients to accurately calibrate said CARIS to measure photoresist thickness for product wafers.

2. The method of claim 1, wherein said monitor wafers are silicon substrates.

3. The method of claim 2, wherein said silicon substrates have a silicon oxide layer between about 190 and 210 Angstroms thick, and a silicon nitride layer having a thickness of between about 2450 and 2550 Angstroms.

4. The method of claim 1, wherein said photoresist is spin coated with increasing thicknesses on said monitor wafers having a range in thicknesses of between about 0.807 and 0.818 micrometers (um).

5. The method of claim 1, wherein said monochromatic radiation dose selected for exposing said photoresist is between 130 and 140 milliJoules per centimeter square (mJ/cm$^2$).

6. The method of claim 1, wherein said critical dimensions of said photoresist pattern are measured using a scanning electron microscope for different thicknesses of said photoresist to determine said minimum in said swing curve.

7. The method of claim 1, wherein said Cauchy coefficients $n_1$, $n_2$, $n_3$ are calculated using said monitor wafer having said predetermined minimum, and using a reflectometer to measure the index n at three different wavelengths, and solving three simultaneous equations for said Cauchy coefficients.

8. The method of claim 1, wherein said monochromatic radiation has a wavelength of between about 193 and 405 nanometers.

9. A method for measuring photoresist thickness using a constant-angle reflection-interference spectrometer (CARIS) with more accurate Cauchy coefficients comprising the steps of:

coating silicon monitor wafers with photoresist layers having varying thicknesses formed by varying the spin speed during said coating of said photoresist layers;

exposing said photoresist layers using monochromatic radiation through a mask and developing said photoresist layers to form photoresist patterns, wherein aid radiation has a dose sufficient to just clear said photoresist layers during development;

measuring the linewidths of said photoresist patterns and plotting said linewidths as a function of photoresist thickness to generate a critical dimension (CD) swing curve having an essentially sinusoidal shape resulting from interference between the transmitted and reflected said monochromatic radiation in said photoresist;

using one of said silicon monitor wafers having one of said photoresist thicknesses for a predetermined minimum in said CD swing curve to calculate more precisely said Cauchy coefficients for measuring said thicknesses;

using said Cauchy coefficients to accurately calibrate said CARIS to measure photoresist thickness for product wafers.

10. The method of claim 9, wherein said silicon monitor wafers have a silicon oxide layer between about 190 and 210 Angstroms thick, and a silicon nitride layer having a thickness of between about 2450 and 2550 Angstroms.

11. The method of claim 9, wherein said photoresist is spin coated with increasing thicknesses on said silicon monitor wafers having a range in thicknesses of between about 0.807 and 0.818 micrometers (um).

12. The method of claim 9, wherein said monochromatic radiation dose selected for exposing said photoresist is between 130 and 140 milliJoules per square centimeter (mJ/cm$^2$).

13. The method of claim 9, wherein said linewidths of said photoresist patterns are measured using a scanning electron microscope for different thicknesses of said photoresist to determine said minimum in said swing curve.

14. The method of claim 9, wherein said Cauchy coefficients $n_1$, $n_2$, $n_3$ are calculated using said monitor wafer having said predetermined minimum, and using a reflectometer to measure the index n at three different wavelengths, and solving three simultaneous equations for said Cauchy coefficients.

15. The method of claim 14, wherein said three different wavelengths are measured in a range of between about 400 and 800 nanometers.

16. The method of claim 9, wherein said monochromatic radiation has a wavelength of between about 193 and 405 nanometers.

* * * * *